Figures 1, 2:
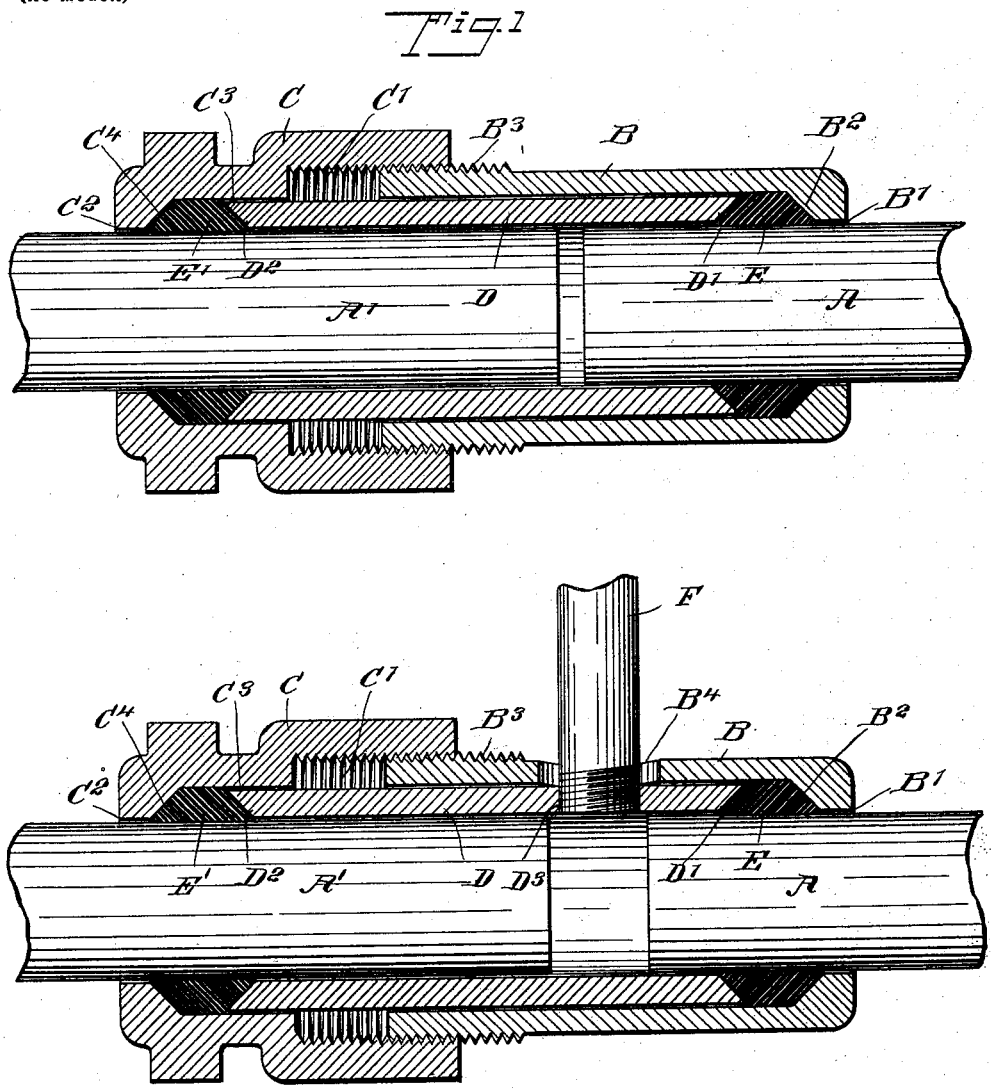

No. 690,797. Patented Jan. 7, 1902.
R. E. VAIL.
EXPANSION JOINT.
(Application filed Feb. 27, 1901.)
(No Model.)

WITNESSES:

INVENTOR
Ralph E. Vail.
BY
ATTORNEYS

UNITED STATES PATENT OFFICE.

RALPH EARNEST VAIL, OF MOUNT VERNON, OHIO.

EXPANSION-JOINT.

SPECIFICATION forming part of Letters Patent No. 690,797, dated January 7, 1902.

Application filed February 27, 1901. Serial No. 49,059. (No model.)

*To all whom it may concern:*

Be it known that I, RALPH EARNEST VAIL, a citizen of the United States, and a resident of Mount Vernon, in the county of Knox and State of Ohio, have invented a new and Improved Expansion-Joint, of which the following is a full, clear, and exact description.

The invention relates to pipe-lines; and its object is to provide a new and improved expansion-joint which is simple and durable in construction, composed of but few parts, arranged to allow free expansion and contraction of the line without danger of leakage, and readily applicable to the pipe-line in case of a leak or break.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in both the views.

Figure 1 is a sectional side elevation of the improvement, and Fig. 2 is a like view of a modified form of the same.

The improved expansion-joint is applied to the adjacent ends A A' of a pipe-line; and it consists, essentially, of a casing B, a nut C, screwing on the casing B, a sleeve D, fitted upon the pipe ends A A', and packing-rings E E' at the ends of the sleeve within the casing B and the nut C, respectively, to form a very tight joint, as hereinafter more fully explained.

The casing B is preferably made cylindrical and formed at its outer end with a smooth bore B' for the passage of the pipe end A, and adjacent to the bore B' inside of the sleeve is formed a bevel $B^2$ for engaging one side of the packing-ring E, the other side of which is engaged by a bevel D', running in an opposite direction to the bevel $B^2$, so as to press the packing-ring E' with its wider inner face in contact with the external surface of the pipe end A. The inner end of the casing B is formed with a thread $B^3$, on which screws the thread C' of the nut C, the latter having two smooth concentric bores $C^2$ $C^3$, of which the bore $C^2$ forms a passage for the pipe end A', and the other bore, $C^3$, is adapted to receive one end of the sleeve D, the other end of which extends into the casing B. The nut
C is formed with a bevel $C^4$ between the bores
$C^2$ $C^3$ to engage the outer end of the packing-ring E', the inner end of which is engaged by a bevel $D^2$, running in an opposite direction to the bevel $C^4$, so as to press the packing-ring E' with its broad inner face against the external surface of the pipe end A', as is plainly shown in the drawings. It will be understood that the sleeve D engages not only the inner surface of the casing B, but the bore $C^3$ of the nut C—that is, the sleeve engages both sections of the joint.

In order to apply the expansion-joint described between the pipe-ends A A', it is only necessary to slip the casing B first over the pipe end A, then apply the packing-ring E on said pipe end, then slip the nut C upon the other pipe end A', together with the packing-ring E', and finally slip the sleeve D upon both pipe ends, and then bring up the casing B and nut C and screw the latter upon the casing to exert a pressure in a longitudinal direction on the packing-rings E E' and cause the same to expand against the beveled ends of the sleeve D and into the bevels of the sleeve D and the bevels $B^2$ and $C^4$ to form a very tight joint and thereby prevent leakage.

In case it is desired to make a branch connection with the pipe-line at the expansion-joint, then the casing B is provided with an elongated opening $B^4$, (see Fig. 2,) through which extends a branch pipe F, the inner end of which screws into a threaded aperture $D^3$ in the sleeve D, so that the pipe F opens into the said sleeve between adjacent pipe ends.

It is understood that the expansion-joint is readily applicable to connect the adjacent ends of two pipes with each other, and in case of a leak or break in the pipe the pipe is cut into at the enlarged portion and then the expansion-joint is placed in position on the adjacent pipe ends, in the manner above described, to couple the ends together, and thereby stop the leak.

Having thus fully described my invention, I claim as new and desire to secure by Letters Patent—

1. An expansion-joint for coupling adjacent pipe ends, comprising a tubular casing having its bore reduced at one end to engage one of the pipe ends, a nut screwing on the other end of the casing and provided at its free end with a bore to fit another pipe end, a sleeve fitted upon both pipe ends and extending within the nut and the casing, said sleeve being provided with a bore for engaging a third pipe end and having its opposite ends beveled in the opposite direction to the adjacent inclined surfaces of the casing and nut respectively, and packing-rings located between said surfaces and the sleeve ends and filling the spaces between them, said packing-rings being beveled so as to fit the nut, casing and sleeve and being narrow at the periphery and wide at their inner surfaces.

2. An expansion-joint for adjacent pipe ends, comprising a casing having its outer end formed with a bore for engaging one of the pipe ends, a nut screwing on the inner end of the casing and having two concentric smooth bores, the smallest of which is adapted to engage the other pipe end, a sleeve fitted upon both pipe ends and extending into the large bore of the nut and into said casing, packing-rings at the ends of the sleeve, one for engagement by the casing and the other by the nut, and a branch pipe extending through an enlarged opening in said casing, and screwing into a threaded opening in said sleeve between adjacent pipe ends, as set forth.

3. An expansion-joint for pipe ends, comprising a casing having one of its ends formed with a bore for slidably engaging a pipe end, and also provided with an aperture, a cap screwed on the other end of the casing and provided with a bore for slidably engaging a second pipe end, a sleeve inclosed within the said casing and cap and provided with a bore registering with the said aperture in the casing for the purpose of engaging a third pipe end, and packings located in the casing and cap respectively and abutting respective ends of the sleeve.

In testimony whereof I have signed my name to this specification in the presence of two subscribing witnesses.

RALPH EARNEST VAIL.

Witnesses:
JUSTUS D. SMOOTS,
PATRICK A. BERRY.